(12) United States Patent
Puczkowski

(10) Patent No.: US 7,210,691 B2
(45) Date of Patent: May 1, 2007

(54) PAINTING ACCESSORY CART

(76) Inventor: Michael B. Puczkowski, 1615 Newman Ave., Lakewood, OH (US) 44107

( * ) Notice: Subject to any disclaimer, the term of this patent is extended or adjusted under 35 U.S.C. 154(b) by 0 days.

(21) Appl. No.: 11/248,027

(22) Filed: Oct. 11, 2005

(65) Prior Publication Data

US 2006/0082087 A1   Apr. 20, 2006

Related U.S. Application Data

(60) Provisional application No. 60/617,866, filed on Oct. 12, 2004.

(51) Int. Cl.
*B62B 1/12* (2006.01)

(52) U.S. Cl. .................. 280/79.5; 280/79.4; 280/79.11; 280/40; 280/47.34; 280/47.131; 280/47.17

(58) Field of Classification Search ............ 280/47.24, 280/47.28, 47.131, 47.17, 79.7, 40, 79.11, 280/47.34, 79.5, 79.4
See application file for complete search history.

(56) References Cited

U.S. PATENT DOCUMENTS

| | | | | |
|---|---|---|---|---|
| 2,497,440 A | * | 2/1950 | Denny ..................... | 280/47.29 |
| 5,464,104 A | * | 11/1995 | McArthur ................. | 211/133.3 |
| 5,678,976 A | * | 10/1997 | Rodriguez ................ | 414/448 |
| 6,296,262 B1 | * | 10/2001 | Skinner ..................... | 280/79.7 |
| 6,474,930 B1 | * | 11/2002 | Simpson .................... | 414/490 |
| 6,637,761 B1 | * | 10/2003 | Boettcher ................ | 280/47.24 |

\* cited by examiner

*Primary Examiner*—Christopher P. Ellis
*Assistant Examiner*—Cynthia F. Collado
(74) *Attorney, Agent, or Firm*—Rankin, Hill, Porter & Clark LLP

(57) ABSTRACT

An accessory cart that is adapted to hold any one of a plurality of conventional buckets. The cart includes a base and a handle that is releasably secured to the base. The base includes a stand portion and a frame portion. The stand portion includes a lower end that engages a floor surface and an upper end that serves as a handle-receiving receptacle. The frame portion is integrally secured to the stand portion and includes first and second arm sections. The arm sections extend away from the stand portion and include a generally horizontally-oriented base section and an upstanding section. The base sections support a bucket, while the upstanding sections define notches that receive a handle of the bucket to securely mount the bucket to the cart.

6 Claims, 4 Drawing Sheets

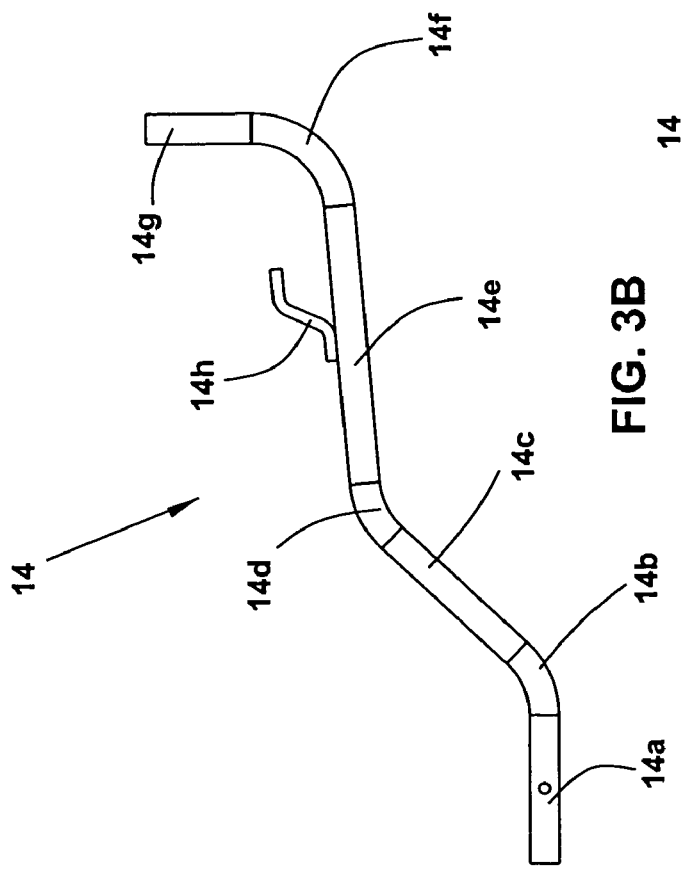
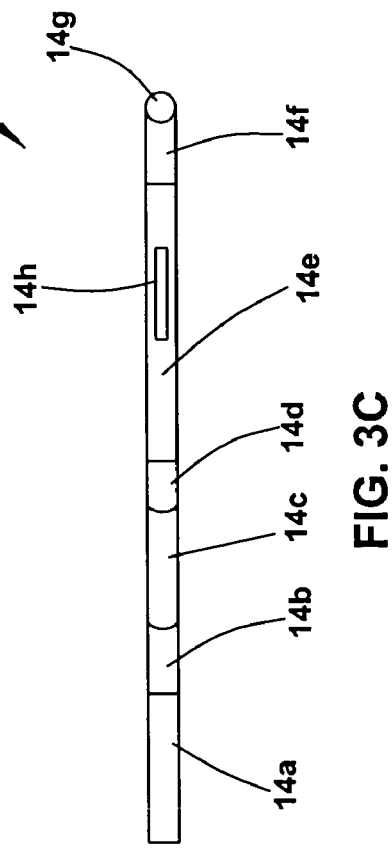
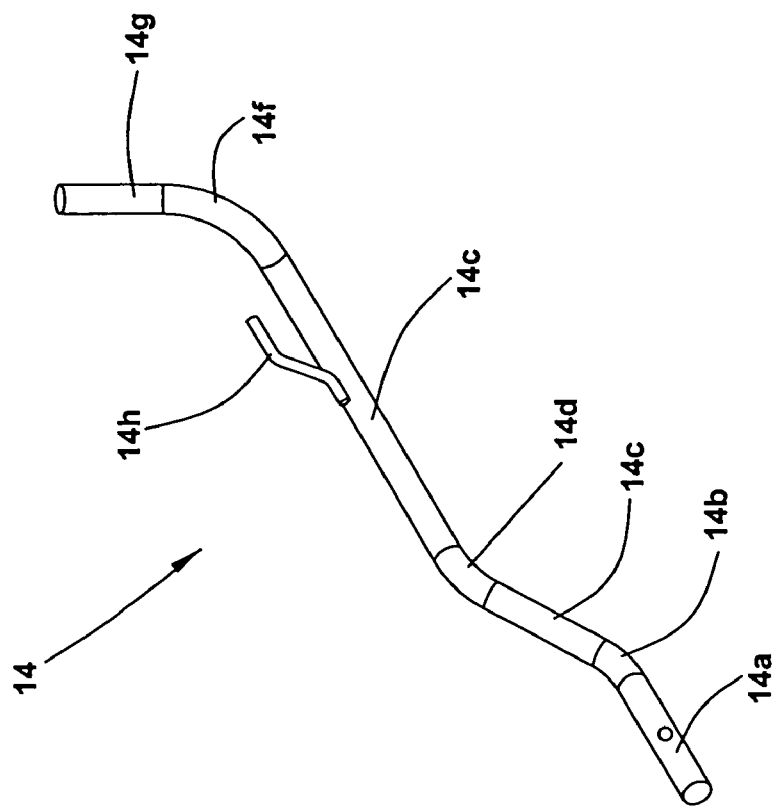
FIG. 3B
FIG. 3C
FIG. 3A

PAINTING ACCESSORY CART

CROSS-REFERENCE TO RELATED APPLICATION

The present application is a non-provisional application claiming priority under 35 USC 119(e) from U.S. provisional application No. 60/617,866, which was filed on Oct. 12, 2004. The disclosure of U.S. 60/617,866 is expressly incorporated herein by reference in its entirety.

BACKGROUND OF THE INVENTION

1. Field of the Invention

The present invention relates generally to carts and, more particularly, to carts that are specially adapted to hold and transport containers that may be used in a painting operation.

2. Description of Related Art

Various types of containers are used to hold paint during a painting operation. These containers include a five gallon bucket, a nine-inch roller bucket, and an eighteen-inch roller bucket. When filled with paint, each of these containers can be difficult to move throughout the room that is being painted. The larger paint-holding containers can be particularly heavy and the smaller containers are unstable and thus prone to spilling paint. Further, when painting, it is necessary to not only fill paint holding containers, but to periodically reposition such containers so as to be close to the surface that is to be painted. Accordingly, during any painting operation, there are many times that the paint holding container must be moved, and a similar number of times that spilling paint from the paint holding container may occur.

Unfortunately, there are no known cart that are adapted to hold and transport paint holding containers. Accordingly, it is conventional in the art to simply move the paint holding container by lifting the paint holding container by its integral handle or by grasping the outside surface of the paint holding container. Naturally, this leads to paint spills and, due to the weight of the paint holding container, possible injury to the painter.

Therefore, there exists a need in the art for a cart that is useful in holding and transporting paint holding containers. Moreover, there exists a need in the art for such a cart that is specially adapted to securely receive any one of a plurality of conventional paint holding containers.

SUMMARY OF THE INVENTION

The present invention is directed toward a cart that is useful in holding and transporting any one of a plurality of conventional paint holding containers. The present invention is further directed toward such a cart that is lightweight, collapsible, and adapted to receive accessory tools and items that a painter may need during a painting operation.

The cart according to the present invention includes a base that releasably receives a handle, with the base being supported by a stand portion and a pair of wheels. The stand portion includes a receptacle in which the handle is releasably received.

The base further includes a frame portion that is integrally secured to the stand portion the frame portion includes a pair of L-shaped arm sections that are spaced apart from one another and the handle, so as to define a bucket-receiving space.

In further accordance with the present invention, the arm sections include a base section upon which the bucket rests and an upright section against which the bucket abuts. The upright sections include a plurality of notches that are positioned to receive a handle extending from the bucket. In this way, any one of a plurality of conventional buckets may be received on the frame base section and in abutting contact with the frame upright section, and with the bucket handle received within the associated notch so as to securely mount the bucket to the cart.

When a bucket is disposed and secured to the cart of the present invention, the cart and bucket may be repositioned by lifting up on the handle so that the weight of the cart and bucket is supported by the cart wheels, and then pushing or pulling the cart to move the cart over a floor surface. When the cart has reached the desired location, the handle is lowered so as to return the stand portion to engagement with the floor surface, and thereby provide stable three-point support for the cart.

BRIEF DESCRIPTION OF THE DRAWINGS

These and further features of the invention will be apparent with reference to the following description and drawings, wherein:

FIG. 3A is a perspective view of a handle of the cart shown in FIG. 1A;

FIG. 3B is a side elevational view of the handle;

FIG. 3C is a rear elevational view of the handle;

DETAILED DESCRIPTION OF THE PREFERRED EMBODIMENTS

Figure 1A:
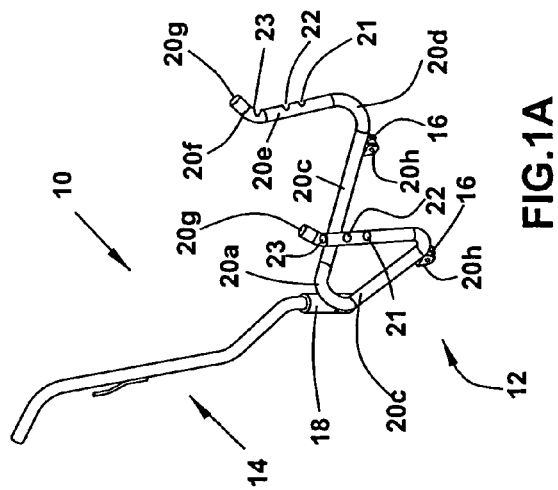
FIG. 1A is a perspective view of the cart according to the present invention.
Figure 1B:
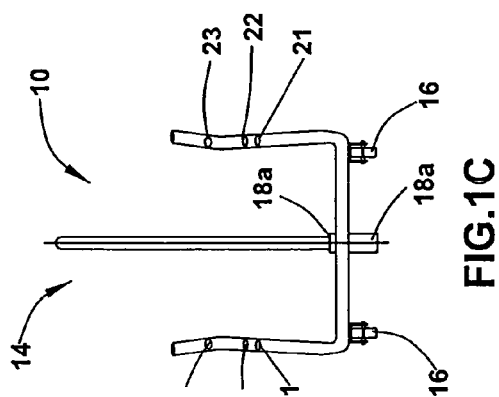
FIG. 1B is a side elevational view thereof.
Figure 1C:
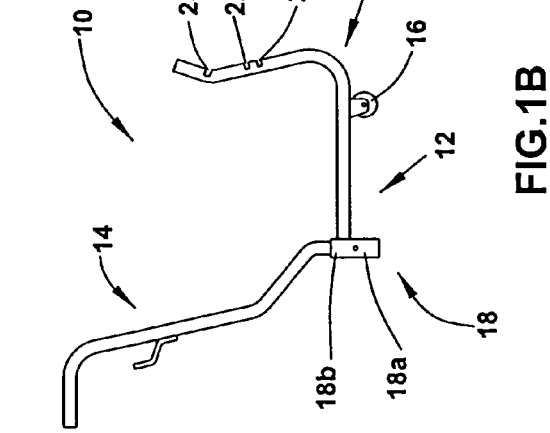
FIG. 1C is a front elevational view thereof.
Figure 1D:
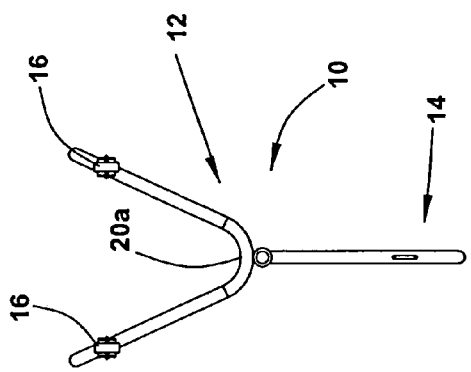
FIG. 1D is a bottom plan view thereof.
Figure 2A:
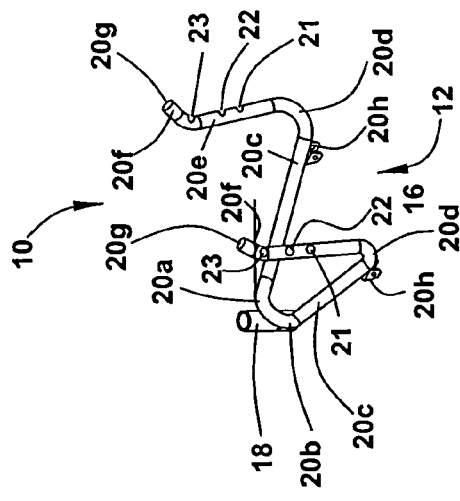
FIG. 2A is a perspective view of a base of the cart shown in FIG. 1A.
Figure 2C:
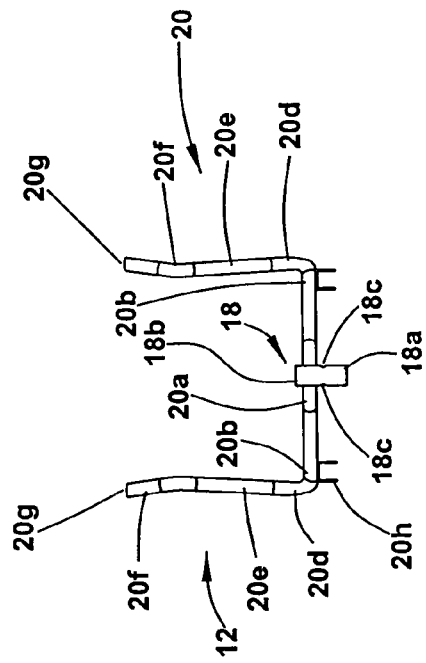
FIG. 2C is a front elevational view of the base.
Figure 2B:
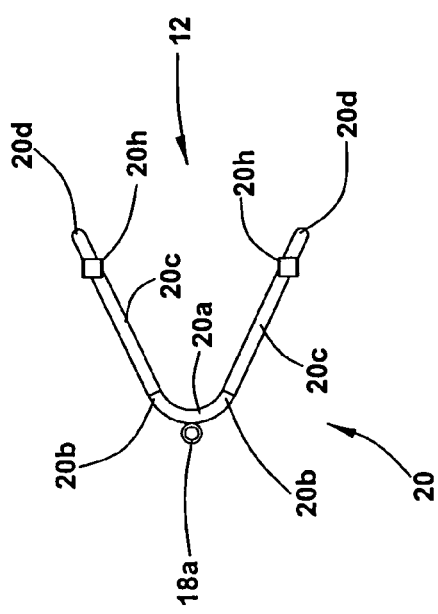
FIG. 2B is a side elevational view of the base.
Figure 2D:
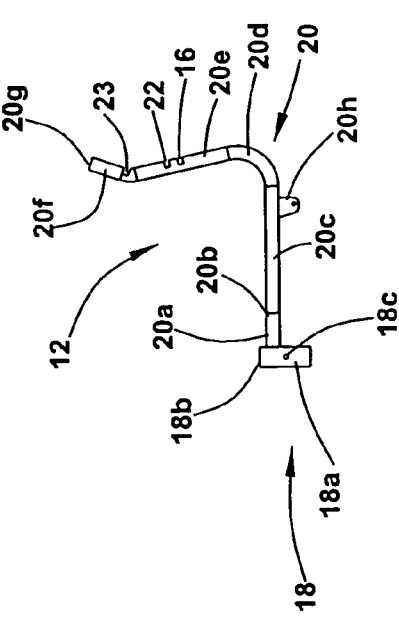
FIG. 2D is a bottom plan view of the base.

With reference to FIG. 1A–1D, a painting accessory cart 10 generally includes a base 12, a handle 14 attached to the base 12, and wheels 16 attached to the base 12. The cart 10 is useful for securely holding and easily moving paint holding containers. As will be described hereinafter, such painting holding containers include conventional five gallon buckets, nine-inch roller buckets, and eighteen-inch roller buckets. Further, the painting accessory cart 10 of the present invention is further adapted to hold various other items that are useful in a painting operation, such as rags, paper towels, paint brushes and the like.

Even though the cart 10 will be described with reference to carrying painting accessories, it is understood that the cart can be used to carry other items in other environments. For example, the cart 10 would also be useful in holding and transporting various buckets used in cleaning operations, and/or buckets and containers that may be used in a wallpapering operation.

With particular reference to FIGS. 2A–2D, the cart base 12 includes a stand portion 18 and a frame portion 20. The stand portion 18 is formed from a hollow cylindrical tube and is generally vertically extending so as to define a lower end 18a including a floor-engaging surface and an upper end 18b defining an upwardly directed receptacle. The stand portion lower end 18a cooperates with the wheels 16 to provide a stable three-point support for the cart 10, as will be appreciated by those skilled in the art. Further, the stand portion lower end 18a preferably receives a plug or cap to close the opening at the lower end of the stand and to provide a non-skid surface to the stand portion.

At one side along its length, the stand portion 18 is affixed to the frame portion 20, preferably by welding. In the illustrated and preferred embodiment, the frame portion 20 is welded to the stand portion 18 at a location that is relatively closer to the stand upper end 18b than the stand lower end 18a, although this is not mandatory.

The stand upper end 18b defines the receptacle that is adapted to releasably, yet securely, receive the handle 14 and, to that end, includes a pair of laterally issuing apertures 18c that are adapted to receive structures that releasably attach the handle 14 to the cart base 12 when the handle 14 is received in the receptacle. Preferably, the apertures 18c are disposed at a location relatively below the location at which the frame portion 20 is affixed to the stand portion 18, and are 90° out of alignment with the frame portion 20 so as to be freely accessible, as illustrated. Structures for releasably attaching the handle 14 to the base 12 are preferably spring-loaded balls extending from the handle 14, but may also include pins, clips, screws, or other means for releasable attachment that are currently known or later developed. Further, although not preferred, it is considered apparent that the handle 14 may be simply pressed into or over the stand portion upper end 18b and held therein or thereon by a friction fit, without departing from the scope and spirit of the present invention.

The frame portion 20 is preferably formed from a single length of hollow cylindrical tubing or pipe that is bent into the desired and illustrated configuration but may, alternatively, be formed from a series of metal tubes that are welded together into the desired and illustrated configuration.

The frame portion 20 includes a U-shaped section 20a and a pair of arm sections. The arm sections may be though of as being somewhat L-shaped when viewed in elevation. A base of the U-shaped section 20a is welded to the stand portion 18, as described hereinbefore. The U-shaped section 20a includes a pair of outwardly extending legs 20b. Each of the legs 20b is preferably integrally formed with one of the arm sections, as described hereinbefore, or may be attached to a proximal end of an associated one of the arm sections.

The arm sections are generally identical and, for ease of description, will be described hereinafter as a series of sections, although, as noted previously, the arm sections are preferably formed together with the U-shaped section as a single or unitary member by bending a single length of hollow, cylindrical metal tubing or pipe. Each arm section includes a proximal end integrally attached to the distal end of the associated U-shaped member leg 20b, and a free distal end 20g. Further, each arm section includes a generally horizontal base section 20c, a first or lower curved section 20d, a vertically extending section 20e, and a second or upper curved section 20f. Although the arm member includes a series of sections, some of which are curved, it is noted that the various sections are aligned with one another so as to fall within a common vertical plane.

The horizontal base section 20c extends between the associated U-shaped member leg 20b and a lower end of the first curved section 20d. The first curved section 20d arcs upwardly and rearwardly to a lower end of the vertically extending section 20e. In this regard it is noted that the vertically extending section 20e is angled slightly so as to extend upwardly and relatively backwardly toward the stand portion 18.

The vertically extending section 20e extends between the upper end of the first curved section 20d and a lower end of the upper or second curved section 20f. The upper curved section 20f extends from the upper end of the vertically extending section 20e to a free upper end 20g (distal end of frame portion). As illustrated, the upper curved section 20f arcs forwardly and upwardly as it extends away from the vertically extending section 20f so that the free end 20g is directed away from stand portion 18 and the handle 14 at an acute angle to vertical. Preferably, the free end 20g receives a plug or cap to close the opening at the free distal end of the arm section.

The horizontal base section 20c includes, adjacent the second end thereof, a downwardly extending, generally U-shaped wheel housing 20h. Each wheel housing 20h receives one of the wheels 16. The wheel housing 20h attaches to the base section 20c such that the wheel housing 20h can or cannot rotate about a vertical axis. If the wheel housing 20h rotates about a vertical axis, the wheels 16 have a caster-type arrangement. If the wheel housing 20h does not rotate about a vertical axis, the wheels 16 have a more conventional design. It is contemplated that, instead of a wheel housing 20h, the wheels 16 may be directly secured to the horizontal base section 20c.

The arm sections include a series of vertically aligned notches 21, 22, 23 that are provided to assist in securing paint holding containers to the frame 20. Preferably, first and second notches 21, 22 are provided in each of the vertically extending section 20e, and a third notch 23 is provided in each of the upper curved section 20f. As will be apparent from the following description, the first notches 21 are vertically aligned with one another and specially positioned to receive a handle from a first conventional paint holding container, the second notches 22 are vertically aligned with one another and specially positioned to receive a handle from a second conventional paint holding container, and the third notches 23 are vertically aligned with one another and specially positioned to receive a handle from a third conventional paint holding container.

In the preferred and illustrated embodiment, the U-shaped member legs 20b are at an angle to one another of about 35-45°, and more preferably about 40°. Further, the horizontal base section 20c and the vertical section 20e are at an angle of about 65–80° and, more preferably 75° to one another.

The handle 14 is preferably formed from a unitary length of hollow, cylindrical metal tubing or pipe, and includes a lower insertion portion 14a, a first lower curved section 14b, a rearwardly extending section 14c, a second lower curved section 14d, a vertically extending portion 14e, an upper curved portion 14f, and an upper terminal portion 14g.

The lower insertion portion 14a defines a lower end of the handle, and includes a pair of diametrically opposed spring-loaded balls 14j that are adapted to be received in the apertures 18c of the stand portion 18. Alternatively, the openings may be provided in the lower insertion portion 14a to receive a pin, clip, screw, or the like.

The first lower curved section 14b extends upwardly and rearwardly from the upper end of the lower insertion portion 14a. An upper end of the first lower curved portion 14b smoothly merges into the rearwardly extending portion 14c, which extends rearwardly and upwardly therefrom. The upper end of the rearwardly extending portion 14c merges into the second lower curved portion 14d, an upper end of which is essentially directed vertically such that the vertically extending portion 14e, which merges therewith, is directed essentially in a vertical plane. An upper end of the vertically extending portion 14e merges into the upper curved portion 14f, which smoothly bends rearwardly such that the upper terminal portion 14g lies in an essentially horizontal plane, as illustrated. An open end of the upper terminal portion 14g receives a plug or cap so as to close the otherwise open end of the handle 14. A rearwardly facing surface of the vertically extending portion 14e has a Z-shaped hook 14h secured thereto, preferably by welding. The hook 14h serves as a hanger that is adapted to receive a rag, paintbrush, or the like.

It will be appreciated that the cart 10 of the present invention is useful for holding various types of paint holding containers, and for transporting such paint holding containers to different locations, as may be desirable during a painting procedure.

Figure 4:
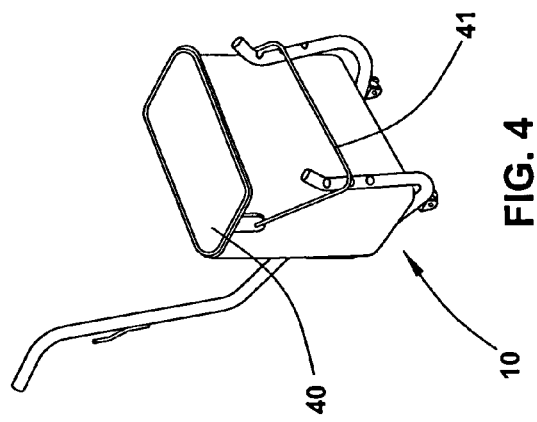
FIG. 4 is a perspective view of the cart holding a conventional nine-inch roller bucket.

For example, with reference to FIG. 4, the cart 10 according to the present invention is shown with a conventional paint holding container, referred to in the art as a nine-inch roller bucket 40. The roller bucket 40 has a bottom wall that is supported at each lateral end by the horizontal base sections 20c, and has a front wall that is adjacent and, preferably, in engagement with a rearwardly-facing surface of the upper curved section 20f. The rear wall of the roller bucket 40 is spaced from the handle 14, as illustrated. The conventional nine-inch roller bucket 40 includes a bail-type handle 41 that is rotated forwardly and downwardly so as to be received in the second notches 22 of the vertically extending sections 20e of the frame 20. Accordingly, the roller bucket 40 is securely mounted to the cart 10.

Figure 5:
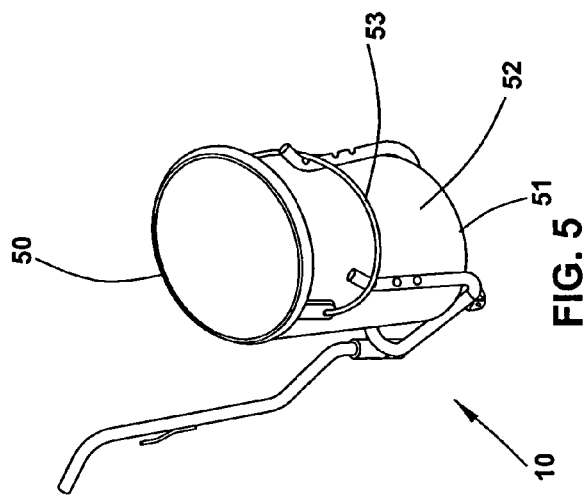
FIG. 5 is a perspective view of the cart holding a conventional five gallon bucket; and, FIG. 6 is a perspective view of the cart holding a conventional eighteen-inch roller bucket.

Another example, illustrated in FIG. 5, shows a conventional five gallon bucket 50 disposed on the cart 10. The bucket 50 includes a bottom wall 51 disposed on the horizontal base sections 20c, and a cylindrical sidewall 52 abutting the inwardly facing surfaces of the upper curved sections 20f. It will be appreciated that the cylindrical sidewall extends between and slightly projects forwardly from the upper curved sections 20f, while a rear surface of the sidewall is spaced forwardly of the handle 14. A conventional handle 53 of the five gallon bucket 50 extends forwardly and downwardly and is received in the third notches 23 formed in the upper curved sections 20f, as illustrated. Accordingly, the five gallon bucket 50 is securely mounted on the cart 10.

Figure 6:
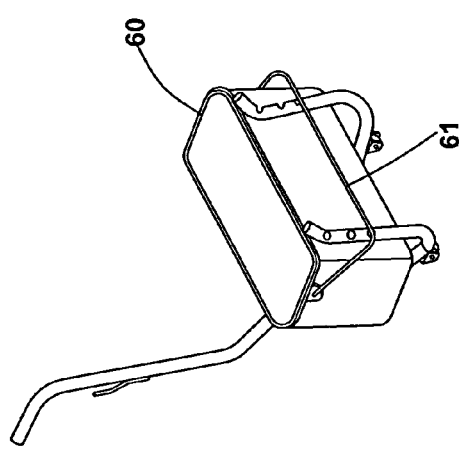

A further example, illustrated in FIG. 6, shows the cart 10 according to the present invention holding a further conventional paint holding container, referred to in the art as an eighteen-inch roller bucket 60. The roller bucket 60 has a bottom wall that is supported by the horizontal base sections 20c, and has a front wall that is adjacent and, preferably, in engagement with a rearwardly-facing surface of the upper curved section 20f. The rear wall of the roller buck 60 is preferably spaced slightly forwardly of handle 14, as illustrated. The roller bucket 60 includes a bail-type handle 61 that is rotated forwardly and downwardly so as to be received in the first notches 21 of the vertically extending sections 20e of the frame 20. Accordingly, the roller bucket 60 is securely mounted to the cart 10. It is noted that the roller bucket 60 extends laterally outwardly past the horizontal base sections 20c. Keeping in mind that the cart is relatively low profile (has a small vertical space between the frame and the floor) this is considered an advantage of the illustrated cart 10. More specifically, should the cart and bucket 60 start to tilt sideways, as may occur when the cart is being moved, the end of the bucket 60 will engage the floor before the bucket has 60 tipped to the extent necessary to spill paint therefrom. Accordingly, the cart 10 cooperates with the eighteen-inch roller bucket 60 in this manner to further minimize paint spills.

It is noted that the buckets 40, 50 and 60 may be further secured to the cart by deploying elastic straps, such as bungee cords (not shown), around the buckets 40, 50, and 60, and securing ends of the straps to the frame 20. For example, hooked ends of a conventional bungee cord could be easily received in any of the notches 21, 22, 23 to releasably yet securely attach the bungee cord to the frame 20.

In each of the foregoing examples, should the cart 10 and bucket 40, 50 or 60 need to be repositioned during a painting operation, the painter merely needs to grasp the handle 14 at the upper terminal portion 14g, and slightly lift the cart 10 off of the support portion 12, so as to support the weight of the cart and bucket 40, 50, or 60 on the wheels 16. Thereafter, the cart 10 and bucket 40, 50 or 50 may be moved by simply pushing or pulling the cart 10 to the desired location. It is further noted that by requiring the cart handle 14 to be lifted for repositioning of the cart 10, the chances of over-rotating the cart are considerably reduced.

It is noted that the present invention is capable of modification, and that one skilled in the art may be motivated to modify or adapt the illustrated cart to satisfy particular bucket holding and transporting requirements and that various rearrangements, replacements, and substitutions of parts may be resorted to without departing from the scope and spirit of the present invention. It is further noted that the cart of the present invention is useful for securely holding and transporting other containers than those illustrated herein, and that such containers may or may not be paint holding containers. Accordingly, the present invention is not to be limited to the cart specifically disclosed herein, and is not to be limited to carts used to hold and transport paint holding containers. Rather, the present invention is only to be defined by the claims appended hereto

What is claimed is:

1. An accessory cart that is adapted to hold any one of a plurality of conventional buckets, comprising:

a base, said base including a stand portion and a frame portion, said stand portion being a vertically extending tube including a lower end that engages a floor surface and an upper end that defines an upwardly-directed handle-receiving receptacle, said frame portion being integrally secured to said stand portion and including a generally U-shaped section and first and second upstanding sections, wherein the U-shaped section includes a base and first and second arms, each of the arms defining an end, said U-shaped section base being joined to the tube at a location intermediate the upper and lower ends of the tube, and wherein the first upstanding section extends upwardly from the end of the first arm and the second upstanding section extends upwardly from the end of the second arm, said frame portion being supported by first and second wheels, said first wheel being disposed adjacent the end of the first arm and the second wheel being disposed adjacent the end of the second arm, wherein said wheels cooperate with said tube lower end to define a three-point support for said cart; and, a handle, said handle including a lower end that is releasably received within said tube upper end.

2. The cart according to claim 1, wherein said base and handle are formed from a hollow tubular material.

3. The cart according to claim 2, wherein each of said upstanding sections include a series of notches.

4. The cart according to claim 3, wherein said notches on the first upstanding section are aligned with corresponding notches on the second upstanding section so as to define a series of pairs of aligned notches.

5. The cart according to claim 4, wherein each pair of aligned notches are positioned and adapted to receive a handle of a conventional bucket while the bucket rests upon the U-shaped section.

6. A method for mounting a bucket onto a cart, said cart including a frame having first and second arm sections, each of said arm sections including a base section and an upstanding section, each of said upstanding sections having a series of notches formed therein, wherein the notches on said upstanding section of said first arm being aligned with the notches on said upstanding section of said second arm so as to define a series of pairs of aligned notches, comprising the steps of:

placing the bucket on said frame such that a bottom surface of said bucket is supported by the base sections of each of said arm sections;

rotating a handle of said bucket into a forwardly and downwardly directed orientation; and, inserting said handle into one of said pair of aligned notches.

* * * * *